United States Patent [19]
Sumner et al.

[11] Patent Number: 6,014,103
[45] Date of Patent: Jan. 11, 2000

[54] PASSIVE NAVIGATION SYSTEM

[75] Inventors: Donald L. Sumner, Keller, Tex.;
Sung-Leung Chew, Jamaica, N.Y.;
Joseph N. Dmytrasz, Glen Head, N.Y.;
Joseph Gatta, Port Washington, N.Y.;
Henry Ritchie, Bayside, N.Y.

[73] Assignee: Lockheed Martin Corporation, Bethseda, Md.

[21] Appl. No.: 09/263,044

[22] Filed: Mar. 5, 1999

Related U.S. Application Data

[63] Continuation of application No. 08/865,541, May 29, 1997, Pat. No. 5,912,643.

[51] Int. Cl.$^7$ .......................................... G01S 3/02
[52] U.S. Cl. ................................................ 342/457
[58] Field of Search ............................................ 342/457

[56] References Cited

U.S. PATENT DOCUMENTS 5,339,684 8/1994 Jircitano et al. .

*Primary Examiner*—Theodore M. Blum
*Attorney, Agent, or Firm*—Seymour Levine; Paul Bernkoph

[57] ABSTRACT

A Passive Navigation System (PNS) provides continuous updating of position, velocity, and attitude information of a vehicle without recourse to radiating or external navigation aids. The system accurately computes navigation information with the utilization of gravity sensors, gravimetric maps, vertical position, and velocity measurements. Sensor and map data are optimally processed by real time filtering to compute the best position, velocity, and attitude of the vehicle. The products of measured gravity gradients and the velocity of the vehicle are integrated over time to obtain a north, east, down gravity vector components which are combined with corresponding components obtained from a vertical deflection map in a complementary filter. North and east components of the combination are compared with the corresponding components from the vertical deflection map, while the down component of the gravity is compared to the down value obtained from a gravimeter. Residuals from these comparisons are utilized in a Kalman filter to provide corrections that render inertial measuring units in the system independent of the vertical deflections and gravity anomalies. Measured gravity gradients are compared to reference map gradients, the residuals being utilized in the kalman filter to estimate long term position errors and to provide correction for gradiometer bias and drift. A vertical position loop mixes gravity down data obtained from a gravimeter and gravity down data obtained from the integrator to provide vertical position which is compared to a reference derived from the difference between a measured vehicle height and terrain height obtained from a geoidal map. The residual of this comparison is utilized in the Kalman filter to improve estimates of east velocity.

17 Claims, 1 Drawing Sheet

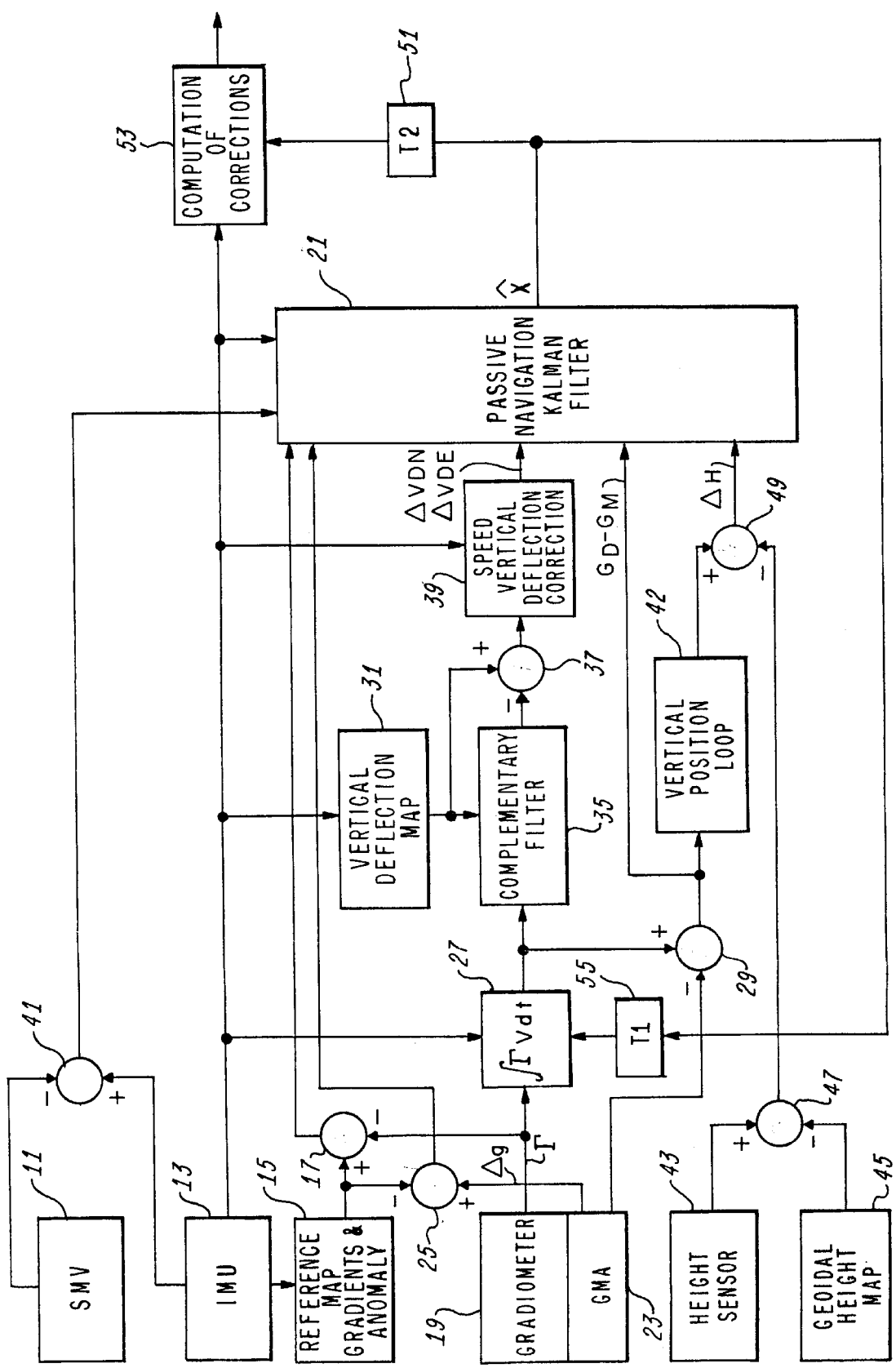

PASSIVE NAVIGATION SYSTEM

This application is a continuation of Ser. No. 08/865,541 filed May 29, 1997 U.S. Pat. No. 5,912,643.

BACKGROUND OF THE INVENTION

1. Field of the Invention

This invention pertains to the field of navigation and more specifically to a navigation system employing only inertial components.

2. Description of the Prior Art

Prior art passive navigation systems utilizing only gyroscopes and accelerometers do not provide the continuous velocity, position, and attitude accuracy generally required for the long term operation of such systems. Position, velocity, and attitude errors caused by drift and gravitational effects on these inertial sensors, rendered them unacceptable as a sole sensors in a navigation system for operation over the long term. Operation over the long term of these prior art inertial navigation systems required periodic updates of position. These updates were generally provided by fixes from the Global Positioning System (GPS), a radar navigation system, or a sonar system.

Significant improvements have been made in inertial instruments such as gyroscopes and accelerometers. Drift has been reduced to insignificant levels leaving only the gravitational effects as the major source of error. Though gravimetric maps are available for the correction of inertial sensor performance, highly accurate corrections can be made with the use of these maps only if the position of the vehicle is precisely known and the maps are error free. Additionally, the vertical gravitational field which is deflected by the coriolis effect is further deflected by the motion of the vehicle. Vertical deflection, create horizontal components, which are known as horizontal gravity anomalies. These anomalies impact on inertial navigation systems very much like accelerometer errors. As the vehicle traverses through the anomalous gravity field, the Schuler loop is excited and velocity and position errors are generated which increase with time. Consequently, if a completely inertial navigation system is to provide sufficient accuracy over the long term, inertial sensor errors, caused by anomalous gravitational fields, must be corrected in real time.

Processing gravity anomalies in a Kalman filter requires complicated modeling. Consequently, inertial navigation systems of the prior art operate in conjunction with electromagnetic systems or external navigation systems, such as the Global Positioning System (GPS) to receive periodic updates from these systems. An inertial navigation system of the prior art, disclosed in U.S. Pat. No. 5,272,639 issued to J. T. McGuffin on Dec. 23, 1993, periodically utilizes three sets of geo-physical correlation data to provide updates to a primary inertial navigator. A Kalman filter is used to correlate terrain data, electromagnetic data, and gravimetric data with the output of a digital map of terrain, electromagnetic field, and gravity. A best of three selection process, based on the errors in the Kalman filter, decides whether to accept the prediction of the terrain system, electromagnetic system, or the gravity system to update the inertial navigator.

SUMMARY OF THE INVENTION

In accordance with the present invention, a Passive Navigation System (PNS) provides continuous updating of position, velocity, and attitude information of a vehicle without recourse to communication with the GPS, a radiating radar system, or a radiating sonar system. The system accurately computes navigation information with the utilization of gravity sensors, gravimetric maps, vertical position, and electromechanical velocity determining devices integrated with inertial measurements. Information derived from the sensors and maps is optimally processed by real time filtering to compute the best position, velocity, and attitude of the vehicle. The product of measured gravity gradients and the velocity of the vehicle are integrated over time to obtain a north, east, down gravity vector. The north, east, and down vector components are filtered in a complementary filter to combine the best of the higher frequency data from the gradiometer with low frequency vertical deflection obtained from gravity maps to form improved vertical deflection and gravity anomaly estimates.

The improved vertical deflection and gravity anomaly estimates are compared to corresponding map values. Residuals from these comparisons are utilized in a Kalman filter to provide corrections that render inertial measuring units that are independent of the effect of vertical deflection and gravity anomaly. Gravity gradients provided by the gradiometer are respectively compared to corresponding gravity gradients provided by a reference gravity gradient map. The residuals of these comparisons are utilized in the Kalman filter to estimate long term position errors and to provide correction data for gradiometer bias and drift.

Gravity down data obtained by integrating the gradient data is compared to gravity down data obtained from a gravimeter, the residual of the comparison is coupled to a vertical position loop which provides vertical position based on the residual data. This gravity derived vertical position is compared to the vertical position obtained from a comparison of the vehicle's vertical position sensor and terrain height obtained from a geoidal map. The residual of this comparison is coupled to the Kalman filter wherein it is utilized to provide an improved east velocity estimate.

BRIEF DESCRIPTION OF THE DRAWINGS

The sole FIGURE is a block diagram of a preferred embodiment of the invention.

DESCRIPTION OF THE PREFERRED EMBODIMENTS

A preferred embodiment of a passive navigation system in accordance with the present invention is shown in the FIGURE. In this embodiment the velocity of a vehicle and its position are continuously measured and calculated, respectively, by two sensor systems, a surrounding-medium-velocity determining system (SMV) 11, and an inertial-measuring-unit (IMU) 13, comprised of gyroscopes and accelerometers. The errors inherent in these sensors are corrected by the passive navigation system, as will be explained, without recourse to communications with the Global Positioning System (GPS) or to any position reference system requiring radiation from the vehicle.

Signals representative of the vehicle position provided by the IMU sensors are utilized to extract gravity gradients and anomalies, at the position indicated, from a reference map 15 stored within the system. Gradient representative signals, at IMU indicated position, are coupled from the reference map 15 to a differencing network 17 to which signals representative of measured gravity gradients, at the actual position, provided by a gradiometer 19 are also coupled.

Gravity gradient components at a point in space may be arranged in a gravity gradient matrix as follows:

$$\begin{vmatrix} \Gamma_{xx} & \Gamma_{xy} & \Gamma_{xz} \\ \Gamma_{yx} & \Gamma_{yy} & \Gamma_{yz} \\ \Gamma_{zx} & \Gamma_{zy} & \Gamma_{zz} \end{vmatrix} \quad \Gamma_{ij} = \frac{\partial g_i}{\partial j}$$

In this matrix the diagonal elements $\Gamma_{ii}$ represent the rate of change of a gravity component at some point in space with the translation of that point in the direction of that gravity component vector, while the off diagonal elements $\Gamma_{ij}$ represent the rate of change of a gravity component at a given point in space with the translation of that point in a direction transverse to the direction of that gravity component vector. With the definitions given above it should be apparent that the matrix is, in general not symmetrical. The asymmetry, however, is slight. Consequently, a symmetrical matrix can be assumed and data with sufficient accuracy for the purposes of this invention may be obtained with only three of the six off diagonal components and the three diagonal components.

Gravity gradients from the reference map 15 are subtracted from gravity gradients measured by the gradiometer 19 in the differencing network 17 to obtain the following set of data for entry into the Kalman filter 21:

$$Y_1 = \Gamma_{xx}(X, Y) - \Gamma_{mapxx}(\overline{X}, \overline{Y})$$
$$Y_2 = \Gamma_{xy}(X, Y) - \Gamma_{mapxy}(\overline{X}, \overline{Y})$$
$$Y_3 = \Gamma_{yy}(X, Y) - \Gamma_{mapyy}(\overline{X}, \overline{Y})$$
$$Y_4 = \Gamma_{yz}(X, Y) - \Gamma_{mapyz}(\overline{X}, \overline{Y})$$
$$Y_5 = \Gamma_{zz}(X, Y) - \Gamma_{mapzz}(\overline{X}, \overline{Y})$$
$$Y_6 = \Gamma_{zx}(X, Y) - \Gamma_{mapzx}(\overline{X}, \overline{Y})$$

where $\overline{X}, \overline{Y}$ is the latitude, longitude indicated by the inertial measuring unit 13 and (X,Y) is the assumed true position. The values $Y_1$ through $Y_6$ allow the Kalman filter to provide accurate estimates of the long term IMU position errors and to correct the gradiometer bias and drift.

Long term IMU position errors and east velocity error may also be modeled with the utilization of gravity anomaly information. Measured gravity anomaly is obtained from the difference between the magnitudes of a gravity measuring accelerometer located in the GMA 23, which measures the total gravitational field, and a gravimeter also located in the GMA 23, which measures the down component of the gravitational field. Both the gravity measuring accelerometer and the gravimeter measurements are influenced by the Coriolis effect on a moving object. The difference between these measurements, however, is devoid of Coriolis influence and is a measure of the gravity anomaly $\Delta g_{GMA}$ at the measurement position. This difference is then subtracted from the gravity anomaly obtained from the reference map 15 in a differencing network 25 to obtain $Y_7$, the seventh element of the input vector to the Kalman filter 21:

$$Y_7 = \Delta g_{GMA}(X,Y) - \Delta g_{MAP}(\overline{X},\overline{Y})$$

where (X,Y) is the position at which the measurements were made and $(\overline{X},\overline{Y})$ is the IMU's indicated position. The value of the vector element $Y_7$ allows the Kalman filter to further improve IMU position error estimation over that obtained by using Gradient Map Matching measurements represented by input vector elements $Y_1$–$Y_6$. Gravity Anomaly Map Matching uses the longer wave length data in the gravity data compared to the shorter wave length data used in the Gradient Map Matching. Consequently, increased accuracy is realized by the Kalman filter with the addition of input vector element $Y_7$, obtained by Gravity Anomaly Map Matching, over that obtained with the sole utilization of input vector elements $Y_1$–$Y_6$, obtained by Gravity Gradient Map Matching. Improved estimation of IMU long term position errors result.

Accuracy of the horizontal velocity determination is dependent on the accuracy of accelerometer measurements. Accelerometer errors may be induced by vertical deflections of the gravity vector. These errors are functions of the latitudinal and vertical positions. Thus, a measure of the vertical deflection effect on the accelerometer measurement may be obtained by integrating, over a specified periods of time, the product of the gravity gradient components along the paths of the vehicle motion and the vehicle velocity. Such an integration is performed in an integrator 27 which receives velocity representative signals from the IMU 13 and gravity gradient representative signals from the gradiometer 19. The result of this integration $G=[\int \Gamma V dt]$ is the gravity vector at the position of the vehicle.

$\Gamma$ can be approximated by a constant matrix over a small time interval, so that the gravity value in the region covered by the time interval is $$G = \Gamma \int_{t_1}^{t_2} V \, dt.$$

The integration results in a distance vector S, so that $G=\Gamma S$. This integration followed by the proper matrix multiplication provides the following vector for G:

$$\begin{vmatrix} \Gamma_{xx}S_x + \Gamma_{xy}S_y + \Gamma_{xz}S_z \\ \Gamma_{yx}S_x + \Gamma_{yy}S_y + \Gamma_{yz}S_z \\ \Gamma_{zx}S_x + \Gamma_{zy}S_y + \Gamma_{zz}S_z \end{vmatrix}$$

When the reference axes are aligned such that x is the north coordinate N, y is the east coordinate E, and z is the down coordinate D; the components of this vector are $$G_N = \Gamma_{xx}S_x + \Gamma_{xy}S_y + \Gamma_{xz}S_z$$
$$G_E = \Gamma_{yx}S_x + \Gamma_{yy}S_y + \Gamma_{yz}S_z$$
$$G_D = \Gamma_{zx}S_x + \Gamma_{zy}S_y + \Gamma_{zz}S_z$$

Gradiometers provide gravity gradients by taking the difference between gravity values determined at two positions. Due to the closeness of these measurement positions, Coriolis effects on the gravity measurements are the same. Therefore, the gradient measurement is independent of Coriolis. Gravimeters, however, provide values for the down component of gravity which include the Coriolis. Consequently, the difference between the down component $G_D$ of the gravity vector and the gravity down component provided by a gravimeter is the gravitational error caused by the Coriolis effect.

To determine the Coriolis effect, the down gravitational vector component $G_D$ is coupled to differencing network 29 to which the vertical gravity component $G_M$, measured by a gravimeter, a gravity measuring accelerometer (GMA) 23, is also coupled. The signal representative of the difference $G_D$–$G_M$ at the output terminal of the differencing network 29 is coupled to the Kalman filter 21 as the eighth element $Y_8$ of the filter input vector. This element is used in the Kalman filter 21 to determine the east velocity error from the Coriolis induced error. It can be shown that the east velocity error is related to the input vector element $Y_8=G_D-G_M$, the Coriolis induced error, in the following manner:

$$Y_8 = G_D - G_M = 2\Omega \mathrm{Cos} L\delta \frac{V_e}{R} + \text{Instrument errors}$$

where:

$\Omega$ is the Earth's rotation rate

L is the latitudinal position of the vehicle $\delta V_e$ is the easterly velocity error R is the radius of the Earth $G_D$, in general, contains the earth gravity values and vertical acceleration information. The differencing network 29 output signal, $G_D-G_M$, is therefore representative of the vertical acceleration. This signal is also coupled to a vertical position loop 42 wherein a double integration is performed to obtain a vertical position estimate $H_v$. Vertical position is also estimated by coupling a signal representative of the vehicle height $H_s$ provided by a height sensor 43, and a signal representative of the geoidal height $H_M$ as given by a geoidal height map 45 to a differencing network 47, which provides an output signal representative of $H_S-H_M$. The signals representative of $H_V$ and $H_S-H_M$ are coupled to another differencing network 49 wherefrom a signal $\Delta H$ is coupled to the Kalman filter 21 as input vector component $Y_9$. The estimation of the east velocity error utilizing the component $Y_9$ is similar to the estimation of the east velocity error utilizing the component $Y_8$. The noise characteristics present in the two observations, however, are different. Use of both components improves IMU east velocity error estimation accuracy.

In addition, the $G_N$ and $G_E$ components of the gravity vector G=ΓS contain high frequency vertical deflection (VD; VDN $G_E$; VDW $G_N$) information. Improved VD values can be obtained by combining $G_N$ and $G_E$ in a complementary filter 35 with corresponding gravitation vector components coupled to the filter 35 from the vertical deflection map 31. The result of the filtering is to combine the best of the higher frequency vertical deflection data obtained from the gradiometer measurements via high pass filtering and the low frequency vertical deflection data from the vertical deflection map 31 obtained via low pass filtering. Filtering in this manner results in an improved vertical deflection estimate. This improved vertical deflection estimate is coupled to the differencing network 37 wherein it is compared with the vertical deflection values provided by the vertical map 31 values to obtain, after conversion for speed dependency in a vertical deflection speed correction unit 39, vertical defection residuals, $\Delta$VDN and $\Delta$VDE. These residuals are fed back to the Kalman filter 21, as component $Y_{10}$ of the input vector, to estimate the VD induced velocity errors via the navigation dynamics.

Two sets of measurements, velocity north and east given by the IMU 11, which provide the vehicle velocity, and the velocity north and east given by the SMV 13, which provides the velocity of the surrounding medium, are used in the Kalman filter to enhance the estimation of IMU north and east velocity errors. The north, $V_N^{IMU}$, and east, $V_E^{IMU}$, velocities determined by the IMU 13 and the north, $V_N^{SMV}$, and east, $V_E^{SMV}$ determined by the SMV 11 are coupled to a differencing network 41. The output of the differencing network 41 provides two elements to the Kalman filter 21 vector input, $Y_{11}=V_N^{IMU}-V_N^{SMV}$ and $Y_{12}=V_E^{IMU}-V_E^{SMV}$. The vector elements $Y_{11}$ and $Y_{12}$ are entered into the measurement matrix of Kalman filter, wherein they are utilized to obtain the enhanced estimate of the north and east velocity errors.

The Kalman filter 21 utilizes the twelve components of the input vector to generate an output state vector $\hat{x}$ which contains signals representative of estimates of position (north, east, down) and velocity errors, dominant long-term IMU errors, wind or ocean current induced errors, gradient measurement errors, map errors, and vertical position detector errors. These values are appropriately transformed in value transformer 51 and coupled to correction computer 53 wherefrom the corrections are respectively distributed to update the vehicles indicated position, velocity, and attitude. Gravitational corrections provided by the Kalman filter are appropriately transformed in transformer 55 and coupled to the integrator 27 to provide gravitational updates. The updated position values are optimal and are generated without the aid of communication with external navigation aids.

While the invention has been described in its preferred embodiments, it is to understood that the words that have been used are words of description rather than limitation and that changes may be made within the purview of the appended claims without departing from the true scope and spirit of the invention in its broader aspects.

We claim:

1. An apparatus for navigating a vehicle, of the type having a gravity sensor, a gravity gradiometer, gravity reference map memory storing geographic gravity data, a vehicle position and velocity sensor, and an optimum filter which utilizes data supplied to provide a state vector, the components of which are used to update navigational data comprising:

an integrator, coupled to said vehicle position and velocity sensor and to said gravity gradiometer, to provide signals representative of an integration, over a selected time interval, of a product of gravity gradient and vehicle velocity, thereby providing output signals representative of a gravity vector having a gravity north component, a gravity east component, and a gravity down component;

a gravity vertical deflection map memory, storing geographic gravity vertical deflection data;

a complementary filter, coupled said gravity vertical deflection memory and to said integrator, to provide signals representative of gravity vertical deflection estimates;

a first comparator coupled to said complementary filter, to said gravity vertical deflection map memory, and to said optimum filter to provide signals representative of differences between gravity vertical deflection read from said gravity vertical deflection map memory and gravity vertical deflection established by said complementary filter; and a correction processor coupled to said optimum filter for updating position, velocity, and attitude of said vehicle.

2. The navigation apparatus of claim 1 wherein said gravity gradiometer provides a measured gravity gradient matrix and said gravity reference map memory provides a reference gravity gradient matrix and further comprising a fifth comparator coupled to said gravity gradiometer, said gravity reference map memory, and said optimum filter to provide signals respectively representative of differences between corresponding components of said measured gravity matrix and said reference gravity gradient matrix, said differences being utilized in the optimum filter to determine long term position errors and to correct gravity gradiometer bias and drift.

3. The navigation apparatus of claim 1 further comprising a second comparator coupled to said gravity sensor, said integrator, and said optimum filter for providing signals representative of differences between said gravity down components determined by said gravity sensor and gravity down components provided by said integrator from which east velocity correction components are established in said state vector.

4. The navigation apparatus of claim 1 further comprising a vertical deflection corrector coupled between said first comparator and said optimum filter, and further coupled to said vehicle position and velocity sensor for providing signals representative of speed corrected residual vertical deflections.

5. The navigation apparatus of claim 1 further comprising a second comparator coupled to said gravity sensor, said integrator, and said optimum filter for providing signals representative of differences between said gravity down components determined by said gravity sensor and gravity down components provided by said integrator from which east velocity correction components are established in said state vector.

6. The navigation apparatus of claim 5 further comprising:

vertical position indicator coupled to said second comparator to provide a signal representative of vertical position of said vehicle;

a height sensor for providing signals representative of vehicle vertical position;

a geoidal height map memory for providing signals representative of terrain height;

a third comparator coupled to said height sensor and said geoidal height map memory to provide signals representative of differences between said vehicle vertical position and said terrain height, thereby providing vehicle vertical position above terrain;

a fourth comparator coupled to said vertical position indicator, to said third comparator, and to said optimum to provide signals representative of differences between said vehicle vertical position above terrain and said vehicle vertical position ($\Delta H$) from which a second east velocity correction component in said state vector is determined.

7. The navigation apparatus of claim 1 wherein said gravity gradiometer provides a measured gravity gradient matrix and said gravity reference map memory provides a reference gravity gradient matrix and further comprising a second comparator coupled to said gravity gradiometer, said gravity reference map memory, and said optimum filter to provide signals respectively representative of differences between corresponding components of said measured gravity matrix and said reference gravity gradient matrix, said differences being utilized in the optimum filter to determine long term position errors and to correct gravity gradiometer bias and drift.

8. The navigation apparatus of claim 1 wherein said gravity reference map memory provides signals representative of reference gravity anomalies and said gravity sensor provides signals representative of measured gravity anomalies and further comprising a second comparator coupled to said gravity reference map memory, said gravity sensor, and said optimum filter for providing signals representative of differences between said measured gravity anomalies and said reference gravity anomalies from which vehicle position errors are determined.

9. An apparatus for navigating a vehicle, the apparatus being of the type having gravity gradiometer for determining gravity gradients, gravity reference map memory which stores geographic gravity data, and a optimum filter which utilizes data supplied to provide a state vector, the components of which are used to update navigation data wherein said gravity gradiometer provides a measured gravity gradient matrix and said gravity reference map memory provides a reference gravity gradient matrix; and further comprising:

a first comparator coupled to said gravity gradiometer, said gravity reference map memory, and said optimum filter for providing signals respectively representative of differences between corresponding components of said measured gravity matrix and said reference gravity gradient matrix from which signals representative of long term position errors and signals for correcting gradiometer bias and drift are determined.

10. The navigation apparatus of claim 9 further comprising:

a gravity sensor for determining gravitation fields;

a vehicle position and velocity sensor, an integrator, coupled to said vehicle position and velocity sensor and said gravity gradiometer to provide signals representative of an integration over a selected time interval of a product of said gravity gradient and said vehicle velocity, thereby providing output signals representative of a gravity vector having a gravity north component, a gravity east component, and a gravity down component;

a second comparator coupled to said gravity sensor and to said integrator to provide signals representative of differences between measured down component of gravity and reference down component of gravity from which an east velocity error component in said state vector is determined.

11. The navigation apparatus of claim 10 further comprising:

vertical position indicator coupled to said second comparator to provide a vertical position signal;

a height sensor for providing a signal representative of vehicle vertical position;

a geoidal height map memory for providing signals representative of terrain height;

a third comparator coupled to said height sensor and said geoidal height map memory to provide signals representative of vertical difference between measured vertical position obtained from said height sensor and terrain height provide by said geoidal height map memory;

a fourth comparator coupled to said vertical position indicator, said third comparator, and said optimum filter to provide signals, to said optimum filter, that are utilized in said optimum filter to provide a second east velocity error component in said state vector.

12. A method of vehicle navigation comprising the steps of:

providing a gravity gradiometer to measure gravity gradients;

storing geographic gravity data in a gravity reference map memory;

establishing an optimum filter to provide a state vector, the components of which are utilized to update sensors of the navigation system;

utilizing said gravity gradiometer and said gravity reference map memory to establish a gravity gradient matrix and a reference gravity gradient matrix, respectively;

determining differences between respective components of said gravity gradient matrix and said reference gravity gradient matrix, thereby establishing gravity gradient component differences;

coupling said gravity gradient matrix component differences to said filter for utilization in said state vector to determine long term position errors and to provided correction data for gradiometer bias and drift.

13. A method in accordance with claim 12 further comprising the steps of:

utilizing a vehicle position and velocity sensor to determine vehicle position and velocity;

producing a product of gravity gradient and vehicle velocity;

integrating said product over a preselected time interval to provide an integrated product having a gravity north component, a gravity east component, and a gravity down component;

determining gravity down with a gravity sensor;

providing differences between gravity down established by said gravity sensor and gravity down produced by said integrating step;

coupling said gravity down differences to said optimum filter wherein it is utilized to determine east velocity error component for said state vector.

14. The method of claim 13 further including the steps of:

determining vertical position from said differences between gravity down established by said gravity sensor and gravity down produced by said integrating step;

sensing height of said vehicle;

utilizing a geoidal height map memory to provide terrain height;

determining difference between said vehicle height and said terrain height;

establishing a difference between said vertical position and said difference between said vehicle height and said terrain height; and utilizing said difference between said vertical position and said difference between said vehicle height and said terrain height to establish a second east velocity error component for said state vector.

15. The method of claim 13 further including the steps of:

storing geographic gravity vertical deflection data;

filtering said gravity vertical deflection data and said integrated product in a complementary manner to provide gravity vertical deflection; and differencing said gravity vertical deflection and said gravity vertical deflection data to provide a gravity vertical deflection difference;

correcting said vertical deflection difference for speed dependency to provide a speed corrected gravity vertical deflection difference; and coupling said speed corrected gravity vertical deflection to said optimum filter as a velocity error component of said state vector.

16. The method of claim 15 further including the steps of:

coupling a vertical deflection corrector between said complementary filter and said optimum filter and to said vehicle position and velocity sensor; and utilizing data coupled to vertical deflection corrector in said optimum filter to determine speed corrected residual vertical deflections.

17. The method of claim 13 further including the steps of:

determining reference gravity anomalies from said gravity reference map memory;

utilizing said gravity sensor to provide measured gravity anomalies;

determining differences between said reference gravity anomalies and said measured gravity anomalies;

coupling said differences between said reference gravity anomalies and said measured gravity anomalies to said optimum filter for the determination of position errors.

* * * * *